United States Patent Office 3,707,555
Patented Dec. 26, 1972

3,707,555
CERTAIN ORGANIC FLUOROAMINO
COMPOUNDS
Charles D. Wright, White Bear Lake, and Joseph LaMar Zollinger, Woodbury Township, Washington County, Minn., assignors to Minnesota Mining and Manufacturing Company, St. Paul, Minn.
No Drawing. Continuation-in-part of application Ser. No. 151,582, Nov. 10, 1961. This application Oct. 15, 1962, Ser. No. 232,327
Int. Cl. C07c 87/22, 87/34, 85/06
U.S. Cl. 260—563 R          17 Claims This application is a continuation-in-part of application Ser. No. 151,582, filed Nov. 10, 1961, now abandoned.

This invention relates to fluorinated oxidant compounds and more particularly to certain new derivatives of fluorinated oxidant compounds with active hydrogen containing organic compounds.

Fluorinated oxidants can be derived from the fluorination of such compounds as ammeline, guanidine and the like. Certain of these oxidants contain at least one —C=NF group and often contain a plurality of fluorinated amino groups; consequently they have strong oxidizing power. While some of such compounds are liquids at ordinary temperatures, a number of the highly active substances which have thus far been produced are gases or quite volatile liquids. Consequently, they are difficult to handle and may be entirely unsuited for certain uses, as, for example, where solid formulations are desirable.

It is an object of this invention to provide a method by which fluorinated oxidants which are normally gaseous or volatile liquids can be converted to less volatile forms.

It is another object of this invention to provide liquid and solid derivatives of fluorinated oxidants. A further object of the invention is to provide certain novel compounds which contain oxidizing fluoramino groups. Other objects of the invention will become evident from the following specification.

It has been found that fluorinated oxidant compounds containing at least one —C=NF group can be made to react with organic compounds containing active hydrogen atoms to form adducts which retain a high percentage of the original oxidizing power of the fluorinated compounds, and are much less volatile than the starting materials. The reaction is found to be catalyzed by bases when the active hydrogen containing compound is not itself nucleophilic.

The fluorine-containing oxidants which are useful in this process, which process is included within the scope of the invention, are illustrated by compounds which generally are represented by the formula:

$$R^1\text{—}\underset{\underset{R^2}{|}}{C}=NF$$

wherein $R^1$ and $R^2$ are each a member of the group consisting of fluorine and difluoroamino, difluoroamino-substituted perfluoroalkyl, difluoroamino-substituted perfluoroalkylfluoroamino, perfluoroalkyl, perfluoroalkylfluoroamino, fluorimino-substituted perfluoroalkyl and fluorimino-substituted perfluoroalkylfluoroamino radicals; and when taken together with the carbon atom to which they are attached, $R^1$ and $R^2$ form a ring system having 6 ring atoms. The perfluoroalkyl radicals preferably have from 1 to 5 carbon atoms.

Illustrative compounds of this type are compounds which are most conveniently represented by structural formulae as follows:

$$(NF_2)_2C\ FNF\overset{NF}{\overset{\|}{C}}NFCF_2NF_2$$

$$C_3F_7\text{—}CF=NF$$

$$F_2N\text{—}CF=NF$$

$$(F_2N)_2C=NF$$

$$CF_3\text{—}CF=NF$$

$$(F_2N)_2C\ FNF\overset{NF}{\overset{\|}{C}}\text{—}NF_2$$

$$NF_2\overset{NF}{\overset{\|}{C}}\text{—}NF\text{—}\overset{NF}{\overset{\|}{C}}\text{—}NF_2$$

$$F_2C=NF$$

$$NF_2\text{—}C_2F_4\text{—}CF=NF$$

$$CF_3NFC(NF_2)=NF$$

$$NF_2CF_2NFC(NF_2)=NF$$

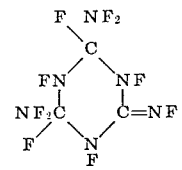

These fluorimino containing compounds can be prepared by two general routes. Those compounds which contain perfluoroalkyl groups of more than one carbon atom are prepared by reductive defluorination of the corresponding saturated difluoroamino perfluoroalkyl compounds (which are prepared by methods such as those described by Lovelace et al., "Aliphatic Fluorine Compounds," pages 20–23 (1936), Reinhold Publishing Co., New York) with suitable reducing agents such as ferrocene. Direct fluorination, as by the use of the Simons fluorination cell, can also be used to prepare the starting materials for reductive defluorination. The other fluorimino compounds, all of which contain an alternating nitrogen-carbon skeletal structure, are prepared by the direct fluorination of starting materials such as ammeline, guanidine, biguanide and melamine or the hydrofluoride salts thereof. The fluorimino compounds are isolated and purified by gas-liquid chromatography in which high boiling fluorocarbon compounds are used as the stationary phase. Methods for the production of these compounds are disclosed in the copending applications of our co-workers, Ser. Nos. 99,632, filed Mar. 30, 1961, now U.S. Pat. No. 3,461,162; 19,111, filed Mar. 31, 1960, now U.S. Pat. No. 3,354,216; 19,112, filed Mar. 31, 1960, now abandoned; and 856,877, filed Dec. 2, 1959, now abandoned.

Broadly the organic active hydrogen containing compounds useful in the process of the invention include members of the group consisting of: $R_3(OH)_n$, $R_5(NH_2)_n$, $R_7(NHR')_n$, $R_7(ONH_2)_n$, $R_7(NHOH)_n$, $R_4(=NH)_n$, $R_6(=NOH)_n$, $R_7(NHNO_2)_n$, $(R_3)_z(COOH)_n$ $(R_5)_z(CONH_2)_n$, $(R_5)_z(CONHNH_2)_n$, $(R_5)_z(CONHR')_n$, $(R_5)_z(CONHOH)_n$ $(R_5)_z(\overset{NH}{\overset{\|}{C}}\text{—}NH_2)_n$, $(R_5)_z(\overset{NH}{\overset{\|}{C}}\text{—}NHR')_n$, $(R_5)_z(\overset{NH_2}{\overset{|}{C}}=N\text{—}OH)_n$ $(R_5)_z(\overset{NH}{\overset{\|}{C}}\text{—}NH\text{—}NH_2)_n$, $(R_5)_z(\overset{NNH_2}{\overset{\|}{C}}\text{—}NH\text{—}NH_2)_n$, $(R_5)_z(\overset{NOH}{\overset{\|}{C}}\text{—}NH\text{—}NH_2)_n$ polyvinyl alcohol, polyallyl alcohol, polyvinylene glycol, cellulose, mononitrate, cellulose dinitrate, polyacrylamide, polyethyleneimine, poly(lower alkyl)ethyleneimine and polyethylene hydrazine;

wherein:

$n$ is an integral number from 1 to 6;

$R_3$ is
   (a) an unsubstituted alkyl group having 1 to 18 carbon atoms and $n$-valencies, (b) a substituted alkyl group having 1 to 18 carbon atoms and $n$ valencies and a total of not more than 3 of double bonds, triple bonds, nitro, carboxyl, carboalkoxy, alkoxycarbonyl, nitrato, nitrido, chloro, fluoro, difluoroamino, oxo and aldehydo groups,
(c) phenyl (lower alkyl),
(d) cycloalkyl having 4 to 6 carbon atoms in the ring and not more than 12 carbon atoms,
(e) oxacycloalkyl having 2 to 5 carbon atoms in the ring and up to 7 carbon atoms,
(f) amino;

$R_4$ is
(a) an unsubstituted alkyl group having 1 to 18 carbon atoms and $2n$ valencies on $n$ carbon atoms,
(b) a cycloalkyl group having 4 to 6 carbon atoms and $2n$ valencies on $n$ carbon atoms, and when $n=1$,
(c) an alkylene group of 4 to 6 carbon atoms having 2 terminal valencies,
(d) a 1-oxoalkylene group of 1 to 6 carbon atoms having 2 terminal valencies,
(e) a 1, ω-dioxoalkylene group of 4 to 6 carbon atoms having 2 terminal valencies;

$R_5$ is
(a) H,
(b) a saturated alkyl group having 1 to 18 carbon atoms and having $n$ valencies,
(c) an unsaturated alkyl group having 1 to 18 carbon atoms and up to a total of three double and triple bonds and $n$ valencies,
(d) cycloalkyl having 4 to 6 carbon atoms in the ring and up to 12 carbon atoms,
(e) phenyl (lower alkyl);

when $n=1$,
(f) amino, when $n=2$ and $z=1$
(g) imino;

$R_6$ is
(a) an unsubstituted alkyl group having 1 to 18 carbon atoms and $2n$ valencies on $n$ carbon atoms,
(b) a cycloalkyl group having 4 to 6 carbon atoms and $2n$ valencies on $n$ carbon atoms;

$R_7$ is
(a) an unsubstituted alkyl group having 1 to 18 carbon atoms and $n$-valencies,
(b) a substituted alkyl group having 1 to 18 carbon atoms and $n$ valencies and a total of not more than 3 of double bonds, carboalkoxy, alkoxycarbonyl and difluoroamino groups;

$R'$ is lower alkyl and
$z$ is 0 and 1.

The hydroxyl group-containing organic compounds which are useful coreactants in the process of the invention can be described generically as organic compounds which contain at least one alcoholic hydroxyl group. A somewhat more specific definition is afforded by the formula:

$$R_3—(OH)_n$$

wherein $R_3$ and $n$ have the above significance.

Hydroxyl group-containing organic compounds which can be used as coreactants to produce compounds of the invention include mono- and poly-hydric alcohols and other compounds containing aliphatic hydroxyl groups such as methanol, isopropanol, pentaerythritol, hexanol, undecanol, and the like; illustrative glycols include ethylene glycol, propylene glycol, butylene glycol, glycerol, tetrahydroxybutane, and the like; representative carbohydrates are mannitol, glucose, sorbitol, starch, dextrin, cellulose, cellulose nitrates and the like. Further included as useful coreactants are cyclic alcohols such as inositol; aralkyl alcohols such as phenylethyl alcohol and substituted alcohols such as allyl alcohol, propargyl alcohol, 2-cyanoethanol, 1,1,1-trinitropropanol-3, 3-hydroxy-propanoic acid, 2-hydroxyethyl methacrylate, methyl 3-hydroxy propanoate, 3-nitrato-1-propanol, 2-chloroethanol, trifluoroethanol, 2,3-bis(difluoramino)-1-propanol, 4-hydroxy-2-butanone, 3-hydroxypropionaldehyde, cyclohexanol, cyclobutanol, 1,2-dihydroxybutane, glycidol, 2-hydroxymethyloxetane, tetrahydro-furfuryl alcohol, 2-hydroxymethyl pyran and 3-phenyl - 1 - propanol, and polymers containing hydroxyl groups, including polyvinylene glycol, cellulose mononitrate, cellulose dinitrate, polyvinyl alcohol and polyallyl alcohol. These latter have polymer chains which contain units which can be represented by the formulae

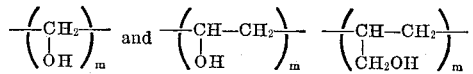

where $m$ is a number representing the average chain length.

The amine group containing organic compounds which are useful coreactants in the process of the invention are the primary amines $R_5(NH_2)_n$ and the secondary amines $R_7(NR'H)_n$. Illustrative of suitable primary and secondary amines are the simple aliphatic amines such as methyl amine, diethylamine, n-butyl amine, dihexyl amine, octadecylamine and the like, alicyclic amines such as cyclohexyl amine, N-methyl cyclohexyl amine, dicyclohexyl amine, bis(4-ethyl cyclohexyl) amine, aralkyl amines such as benzyl amine, N-ethyl benzyl amine, phenylethylamine, succinimide, glutarimide, adipimide, caprolactam, cyclohexylimine, pyrrolidone, piperidine, pyrrolidone and acetaldimine, N-decylbenzylamine, dibenzyl amine, and polymers containing amine groups such as polyvinyl amine, polyallylamine, polyethylenimine, poly(lower alkyl)ethylenimine.

Suitable O-alkyl hydroxylamines and N-alkyl hydroxylamines are O-methylhydroxylamine, N-octyl hydroxyl amine, N-allylhydroxylamine, N-(2-carbethoxyethyl)-hydroxylamine, N-(2-acetylethyl)-hydroxylamine and N-2,3-bis(difluoroamino)-propyl hydroxyl-amine; suitable nitramines include methylene dinitramine and butyl nitramine.

Suitable carboxylic acids and derivatives thereof include, for example, acetic acid, acrylic acid, phenylacetic acid, cyclohexyl carboxamide, acrylamide, urea, formhydrazide, phenylacethydrazide, semicarbazide, N,N'-dimethyloxamide, N-hydroxyformamide, N,N'-dihydroxyadipamide, biguanide, guanidine, formamidine, dodecanamidine, oxaldiamidine, N-methylformamidine, diaminoglyoxime, aminoformaldoxime, aminoguanidine, stearhydrazidine, N,N' - diaminopropionamidine, 1 - hydrazinomyristaldoxime.

The process of the invention is an addition reaction which can be represented for the case of hydroxy compounds by the following equation:

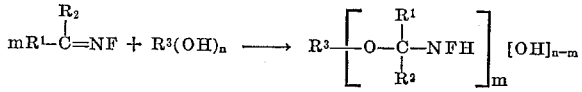

wherein $R^1$, $R^2$, $R^3$ and $n$ have the same significance as hereinabove and $m$ may be equal to or less than $n$. It will be evident that when polyfunctional compounds are used, one or more of the functional groups may react. Generally speaking, longer reaction times will cause completion of the reaction and condensation of the oxidant with most of the available functional groups, when at least the equivalent amounts of the fluorimino compound are used.

Broadly speaking, the process of the invention is carried out by bringing together both of the reactants at a relatively low temperature. Preferably, for use in the process of the invention, the active hydrogen-containing compounds are substantially anhydrous. The fluorinated oxidant compounds are often conveniently handled in the form of gases, and in carrying out the reaction, the oxidant gas is condensed into the active hydrogen-containing compound or a solution thereof.

The addition of a basic catalyst is necessary when the addend, i.e. active hydrogen containing organic compound, is less nucleophilic in character than 2-chloroethanol and is desirable when not actually as basic as urea. Practically this means that a basic catalyst is employed when the addend is a carboxylic acid or an alcohol which contains electron withdrawing substituents. The added catalyst should provide the same anion species as the addend. Thus sodium acetate is used with acetic acid, sodium propionate with propionic acid etc. An alkali metal or hydroxide, oxide, hydride or other suitable base, may be added to the addend before reaction to provide the catalyst. Tertiary amines and quaternary ammonium hydroxides are also suitable for use as catalysts, e.g. trimethylamine, pyridine, tetramethylammonium hydroxide.

The solvents which can be employed are organic solvents which are inert to the oxidizing agent at temperatures employed. Examples of such solvents are acetonitrile, acetone, benzene, methylene chloride, carbon tetrachloride, dioxane, tetrahydrofuran, dimethoxyethane, sulfolane and the like.

The process is carried out at temperatures ranging from −80° to 125° C. for periods ranging from 5 minutes to 24 hours or more up to 2 weeks in some instances. It is unexpectedly found that very little exotherm occurs in the addition of hydroxyl group containing compounds, e.g. alcohols, oximes, etc. and that the reaction proceeds smoothly. Highly nucleophilic addends react with greater exotherm which must be controlled, e.g. by external cooling, careful addition or inverse addition.

The properties of the fluorinated oxidants must of course be taken into consideration and overheating of sensitive compounds must be avoided, gaseous reactants being handled by suitable techniques. Many of the compounds of the invention have a very high N-F content and may explode with high energy release. Caution must be exercised during the preparation and manipulation of these products such as performing operations behind suitable shields and wearing protective jackets, gloves and ear plugs to prevent personal injury in the event of explosions. The occasional explosion of perfluoroguanidine when frozen to −196° C. during vacuum transfers is largely avoided by transferring in vacuo at temperatures above the melting point of perfluoroguanidine, e.g. −119° C. using a bromoethane slush bath as cooling medium.

The compounds of the invention are liquids or solids having strong oxidizing power. They are useful for incorporation into propellants as the oxidant component and for other applications in which their oxidizing power can be utilized, as, for example, as bleaching agents and the like.

Continued heating of the adducts of the invention causes elimination of $HF$ or $HNF_2$ between vicinal carbon and nitrogen atoms to form derivatives which retain the characteristic lower volatility and a substantial oxidizing power. Since no generic term appears to be available for this type of reaction, it is termed vicinal elimination. This is illustrated for the case in which hydroxyl groups are present in the addend by the following equations, in which $R_1$, $R_3$ and $n$ have the significance set forth above.

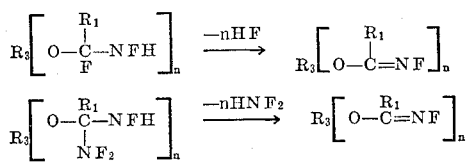

The resultant fluorimino compounds or hydrolysis products may undergo further reaction in the presence of excess addend as shown, for example, by the reaction of methanol with perfluoroguanidine.

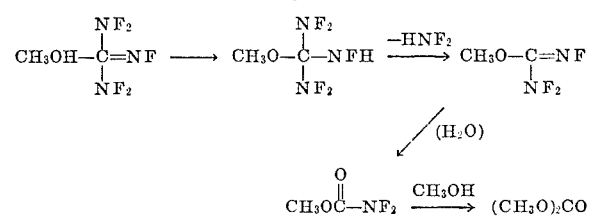

It is found that compounds possessing the groups $$-OCR_1R_2NF-$$

and $=N-CR_1R_2NF-$ are relatively stable when not attached to hydrogen, thus the monofluoroamino compounds of the invention are stabilized not only against the above described vicinal elimination of $HF$ or $HNF_2$ but are also rendered less shock sensitive when the hydrogen atoms are effectively replaced by a less labile atom or group. Fluorination with elemental fluorine under mild conditions to form the corresponding difluoroamino compounds thus effects stabilization. The fluorination of the monofluoroamino group is effected under conditions which may be mild enough to cause no fluorination on carbon atoms as described more fully hereinafter. Replacement of the hydrogen atom by chlorine as in $-NFCl$ also effects stabilization.

The following examples will more specifically illustrate the best mode presently contemplated of practicing the process of the invention and the compounds obtained thereby.

EXAMPLE 1

A dry 1.5 cc. capacity cylindrical glass tube suitable for nuclear magnetic resonance measurements is charged with 0.038 g. (0.64×10⁻³ mole) of isopropyl alcohol. The vessel is cooled in liquid air and 0.107 g. (0.72×10⁻³ mole) of perfluoroguanidine (B.P. −2° C.; calculated for $CF_5N_3$: C=8.1, F=63.7, N=28.2, M.W.=149; found C=8.3, F=62.2, N=28.2, M.W.=148) is introduced. The tube is sealed near the top while under vacuum and the reactants allowed to come to room temperature. The resulting homogeneous solution is allowed to stand for about 20 hours at 25° C. Nuclear magnetic resonance spectra indicate that the major product of the reaction is the adduct

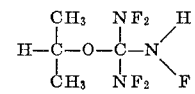

Proton nuclear magnetic resonance absorptions are observed for the $-CH_3$ groups at about 8.6τ, the

group at about 5.0τ, and the $-NHF$ group at about 1.0τ. Fluorine nuclear magnetic resonance absorptions are observed for the $-NF_2$ groups at about $-21\phi$ and for the $-NHF$ group at about $+136\phi$.

The product of the reaction is isolated by opening the tube and removing the low-boiling components. Infra-red analysis of the residual volatile materials obtained on opening the reaction tube shows the presence of small amounts of unreacted perfluoroguanidine and difluoramine. The colorless liquid product remaining in the reaction tube has a vapor pressure of about 9 mm. of mercury at 25° C. Infra-red analysis of the liquid supports the structure given above for the major product and also indicates the presence of the unsaturated compound

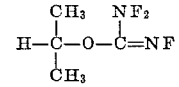

derived by splitting off $HNF_2$ from the initial adduct.

A thin layer of the liquid product explodes in a conventional drop tester operated at heights between 3.8 and 10 cm. with a 2 kg. weight.

EXAMPLE 2

Employing the technique of Example 1, 0.057 g. ($1.8 \times 10^{-3}$ mole) of methyl alcohol and 0.048 g. ($0.33 \times 10^{-3}$ mole) of perfluoroguanidine are placed in a reaction tube. Mixing of the reactants occurs on warming to room temperature to give a homogeneous solution. The solution is allowed to stand for about 20 hours at 25° C.

Fluorine and proton nuclear magnetic resonance spectra show that all of the perfluoroguanidine has reacted and a new compound has formed. Absorption peaks at $-21\phi$ (—$NF_2$) and $+145\phi$ (—NFH), the latter giving a double quintruplet in the fine structure, plus the absorption at $6.0\tau$ (—$CH_3$) indicate quantitative formation of the compound,

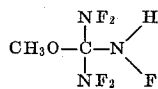

an oxidizing liquid of moderate boiling point. (Vapor pressure about 15 mm. at 25° C.) Infrared and mass spectral data support the structure of the adduct.

Treatment with nucleophilic agents (e.g. NaF or long standing causes vicinal elimination of $HNF_2$ and formation of

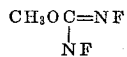

(F—N.M.R.: $NF_2$, $-41.1\phi$; =NF, $+45.3\phi$). The adduct is also sensitive to acids.

The adduct is stabilized towards acids and bases by reaction with fluorine which first converts the —NFH group to —$NF_2$, and then under more severe conditions replaces the hydrogen atoms of the $CH_3$ group. This treatment is also found to render the adduct less shock sensitive.

About 0.60 cc. (0.8 gm., $4.4 \times 10^{-3}$ mole) of the methyl alcohol-perfluoroguanidine adduct is transferred to a copper dish with a polyethylene dropper. The chamber is purged with nitrogen, cooled to $-35°$ and a 2.7% $F_2$ (97.3% $N_2$) stream passed over the adduct for 3 hours conducting the gas stream through about 10 inches of copper tubing into a trap cooled to $-183°$. The system is then purged with $N_2$ and allowed to warm to room temperature. There is no visible residue in the copper dish.

The fluorination trap is degassed at $-195°$ and then allowed to warm to room temperature while pumping through U tubes (in series) cooled at $-23°$, $-119°$ and $-196°$, respectively. The $-119°$ trap contains methoxytris(difluoroamino) methane, a colorless liquid having a vapor pressure of about 70 mm. at 25° C.

$$CH_3O—C(NF_2)_3$$

F—N.M.R.: $NF_2$, $-22.2\phi$
H—N.M.R.: $CH_3O$, $5.87\tau$

Fluorination in the same apparatus described above except at $-20°$ C. and 4.3% $F_2$ for 2 hours yields additionally, the following fluoro- and difluoro-methoxy tris (difluoramino)methanes:

$$FCH_2OC(NF_2)_3$$

F—N.M.R.: $NF_2$, $-23.5\phi$; CF, $+149.3\phi$ triplet
H—N.M.R.: $CH_2$, $4.16\tau$ doublet $$F_2CHOC(NF_2)_3$$

F—N.M.R.: $NF_2$, $-24.5\phi$; $CF_2$, $+80.6\phi$ doublet
H—N.M.R.: CH, $3.04\tau$ triplet These structures are further supported by infrared and mass spectral data.

Reaction of $CH_3OC(NF_2)_2NFH$ with $NO_2Cl$ in a sealed tube yields the following products in about equal amounts $$CH_3OCF(NF_2)_2$$

F—N.M.R.: $NF_2$, $-18.9\phi$; CF, $+120.5\phi$

Calculated for $C_2H_3ON_2F_5$: M.W. 166; C, 14.5; F, 57.2.
Found: M.W. 149; C, 14.2; F, 53.2.

Infrared and mass spectral data are consistent. This compound is stable to the action of HBr- acetic acid reagent.

$$CH_3OC(NF_2)_2NFCl$$

F—N.M.R.: $NF_2$, $-24.8\phi$; NF, $+9.7\alpha$
H—N.M.R.: $CH_3O$, $5.93\tau$

Reaction of $CH_3OC(NF_2)_2NFH$ with nitrosyl fluoride or nitrosotrifluoroacetate at room temperature in a sealed tube also affords the compound $CH_3OCF(NF_2)_2$.

EXAMPLE 3

Employing the procedure of Example 1, 0.020 g. ($6.7 \times 10^{-4}$ equivalents) of dry glycerine, 0.128 g. ($8.7 \times 10^{-4}$ moles) of perfluoroguanidine and 0.048 g. of tetrahydrofuran (previously distilled from sodium) are reacted. The tube is warmed to room temperature. Two phases are present; the glycerine is one phase and a solution of perfluoroguanidine in tetrahydrofuran constitutes the other phase. The reaction is complete after three days at room temperature and a homogeneous liquid is formed. Fluorine and hydrogen nuclear magnetic resonance spectra are obtained. The perfluoroguanidine is completely reacted.

Strong absorptions are observed for —$NF_2$ groups at about $-21\phi$ and for —NHF groups at about $+142\phi$. Nearly complete reaction to form

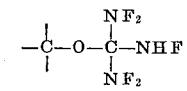

groups has occurred. A small amount of

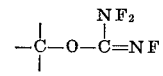

groups is also present as indicated by the presence of small amounts of $HNF_2$ and of other weak absorptions in the fluorine nuclear magnetic resonance spectrum.

When the product is fluorinated as described above using approximately stoichiometric amounts of dilute fluorine in nitrogen the NHF groups are fluorinated to $NF_2$ groups with the formation of glyceryl tri(tris(difluoroamino)methyl)ether.

EXAMPLE 4

Solvent absent

Employing the procedure of Example 1, 0.021 g. ($6.8 \times 10^{-4}$ equivalents) of pure ethylene glycol and 0.125 g. ($8.3 \times 10^{-4}$ moles) of perfluoroguanidine are reacted. Two phases are present at room temperature. The upper ethylene glycol phase slowly dissolves during a period of about 24 hours. A fluorine nuclear magnetic resonance spectrum (F—N.M.R.) of the resulting homogeneous liquid shows that only small amounts of perfluoroguanidine remain unreacted. The spectrum also indicates that the major product is

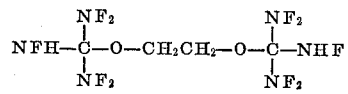

Absorptions are observed for the —$NF_2$ groups at about $-21\phi$ and for the —NHF group at about $+137\phi$ in this adduct. The proton nuclear magnetic resonance spectrum shows an absorption at about 1τ which also confirms the presence of the —NHF group. Additional absorptions indicate the formation of small amounts of other compounds which include

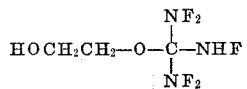

Mono adduct with solvent present

One tenth ml. of a dry acetonitrile solution containing 8.85 mg. (1.43×10⁻⁴ moles) of ethylene glycol is transferred in a dry nitrogen atmosphere to a slender cylindrical dry glass vessel of 1.5 ml. capacity which is then connected to a vacuum manifold system. The acetonitrile solution is chilled to −196° C. and 24.4 mg. (1.64×10⁻⁴ moles) of pure perfluoroguanidine are added by distillation, as well as a minute reference amount of tetramethyl silane. The vessel is closed and the solution allowed to warm to room temperature. After five days, the proton nuclear magnetic resonance spectrum shows twin weak bands centered at about −1.2 and 0.1τ and strong complex bands centered at about 5.5τ and 6.2τ in addition to the reference absorptions due to (CH₃)₄Si and CH₃CN. Fluorine N.M.R. shows very weak twin absorptions at about −47ϕ and −42ϕ, a single sharp absorption at about −21ϕ and weak doublet absorption at about 140.5ϕ (estimated J about 50 c.p.s.). All these data are consistent with the structure:

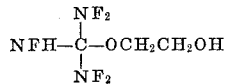

Diadduct with solvent present

The procedure employed above for the monoadduct is repeated employing 214 mg. (1.44×10⁻³ moles) of perfluoroguanidine and ten days reaction time. No tetramethyl silane is added. The proton nuclear magnetic resonance spectrum shows (in addition to the reference absorption of acetonitrile at 8.0τ) a doublet absorption (—NHF) at about −0.4τ (J=51.5 c./sec.) and strong singlet absorption (—CH₂—) at about 5.4τ. The fluorine nuclear magnetic resonance absorptions at about —47ϕ, —42ϕ and —18ϕ are due to residual perfluoroguanidine; a strong doublet absorption at about —22ϕ (J=ca. 52 c.p.s.) to NF₂ groups and a complex absorption, apparently a twinned quintuplet (J=ca. 10 c.p.s.) at +142ϕ to —NFH groups. Evaporation of the solution provides [(NF₂)₂NFHCOCH₂]₂ as a shock sensitive viscous pale yellow oil.

A sample of the above [(NF₂)₂NFHCOCH₂]₂ dissolved in 0.5 ml. CF₃CH₂OH is fluorinated using a slight molar excess of elemental fluorine diluted with twenty times its volume of pure nitrogen during 5 hours at −20° C. to −23° C.

Evaporation of the trifluoroethanol leaves

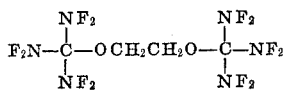

as a pale yellow, viscous oil having a single symmetrical strong fluorine nuclear magnetic resonance absorption (—NF₂) at about −22.5ϕ.

EXAMPLE 5

Employing the procedure of Example 1, 0.034 g. (1.70×10⁻⁴ mole) of an equimolar mixture of the cis- and trans forms of perfluoro-N-methyl guanidine and 0.062 g. (1.95×10⁻⁵ mole) of dry methyl alcohol are reacted. After sealing the glass tube, the mixture is warmed cautiously to room temperature with intermittent cooling in liquid nitrogen to prevent rapid bubbling. A homogeneous liquid is obtained. Fluorine nuclear magnetic resonance absorptions are observed at about −18ϕ (NF₂), at about +95ϕ (—NF— in CF₃NF—), at about +70ϕ (CF₃ in CF₃NF—) and at about +145ϕ (—NFH) showing that the perfluoro-N-methyl-guanidine is completely reacted with the formation of

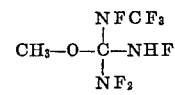

EXAMPLE 6

Employing the procedure of Example 1, 0.027 g. (0.84×10⁻³ mole) of methyl alcohol and 0.124 g. (1.06×10⁻³ mole) of perfluoroformamidine (B.P. approximately −29° C.) are placed in a reaction tube. A homogeneous liquid is obtained when the mixture warms to room temperature.

Nuclear magnetic resonance spectra indicate that reaction takes place to form the normal adduct (A) absorptions at −16ϕ (NF₂) and about +136ϕ (NFH), which then loses HF by vicinal elimination to give the unsaturated compound (B)

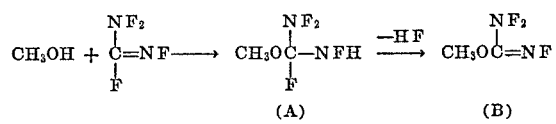

Subsequent hydrolysis and methanolysis form successively methyl N,N-difluorocarbamate and dimethyl carbonate as described hereinabove.

EXAMPLE 7

Employing the procedure of Example 1, 0.074 g. (2.48×10⁻⁴ mole) of perfluorocyclohexylimine and 0.049 g. (1.52×10⁻³ mole) of reagent grade methyl alcohol are reacted. Two phases are present and there is no evidence of reaction after 16 hours at 25° C. The mixture is then shaken and heated for 16 hours at 53° C. to give one homogeneous phase. The fluorine nuclear magnetic resonance spectrum of this material shows the presence of a moderate amount of unreacted perfluorocyclohexylimine and a larger amount of the adduct

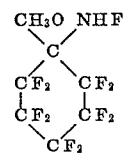

Several absorptions between +110ϕ and +145ϕ afford evidence for the presence of the saturated perfluorocyclohexane ring. An additional absorption at about 150ϕ indicates the presence of the —NHF group in the adduct. Confirmatory evidence for the adduct is provided by the proton nuclear magnetic resonance absorptions at about 1.5τ (—NHF) and at about 6.2τ (CH₃O—).

EXAMPLE 8

Employing the procedure of Example 1, 0.081 g. (5.0×10⁻⁴ mole) of 1-hydroxy-2,3-bis(difluoramino) propane (prepared by heating allyl alcohol with an excess of N₂F₄ at 100° C. in a sealed tube), 0.05 g. (3.3×10⁻⁴ mole) of perfluoroguanidine, 0.3 gm. of methylene chloride and 0.007 g. of triethylamine are placed in a reaction tube. The tube is sealed and allowed to stand at room temperature for six days. Fluorine nuclear magnetic resonance absorptions at; —56.5φ (—CH₂—NF₂), —40.3φ (—CH—NF₂), —22.1φ doublet (C—(NF₂)₂), +137.5φ doublet quintuplet (—NFH) show complete reaction of perfluoroguanidine to form the saturated adduct:

$$CH_2(NF_2)-CH(NF_2)-CH_2-O-C(NF_2)_2-NFH$$

When fluorinated by the mild procedures described hereinabove, the above compound provides $$CH_2(NF_2)-CH(NF_2)-CH_2-O-C(NF_2)_3$$

which is illustrative of novel ultra high energy oxidants of the invention having the formula M—C(NF₂)₃ having molecular weights between about 195 and 525 and containing from about 45 to about 65 percent by weight of oxidizing fluorine wherein M is an acyclic radical group consisting of the elements H, C, N, O, F and Cl, the valence of the radical group being on an element having an atomic number from 7 to 8. Further examples of such compounds will be seen to be provided by the fluorinated adducts of Examples 2, 3 and 4 above and Examples 60 and 67 below. Such compounds are generally provided by fluorination of adducts formed with relatively low molecular weight compounds.

EXAMPLE 9

A mixture of sorbitol and perfluoroguanidine (condensed into the reaction vessel at liquid nitrogen temperature) is sealed in a glass tube and heated at about 48° C. for 16 hours. A white solid having oxidizing power is obtained which contains —NF₂ and —NFH groups.

When the following oxidants are reacted with methanol at 25° C. in dry glass equipment by the procedures hereinabove described in greater detail, the products indicated in Table I are formed.

TABLE I

| Example | Oxidant | Products |
|---|---|---|
| 10 | $F_2-C=NF$ | $CH_3OCF_2NFH$ and $CH_3OCF=NF$ |
| 11 | $NF_2CF_2CF_2CF=NF$ | $NF_2CF_2CF_2CF-NFH$ $\\|\ OCH_3$ and $NF_2CF_2CF_2C=NF$ $\\|\ OCH_3$ |
| 12 | $(NF_2)_2CFNFC=NF$ $\\|\ NF_2$ | $(NF_2)_2CFNF-C-NFH$ with $OCH_3$ and $NF_2$ substituents |
| 13 | $CF_3CF=NF$ | $CF_3CF-NFH$ $\\|\ OCH_3$ and $CF_3C=NF$ $\\|\ OCH_3$ |
| 14 | $FN=CFCF_2CF=NF$ | $HFNCF-CF_2-CFNFH$ with $OCH_3, OCH_3$ and $FN=C-CF_2-C=NF$ with $OCH_3, OCH_3$ |
| 15 | $FN=C-NF-C=NF$ with $NF_2, NF_2$ | $HFN-C-NF-C-NFH$ with $OCH_3, OCH_3$ and $NF_2, NF_2$ |
| 16 | $CF_3-NF-C-NF-C-NF_2$ with $=NF, =NF$ | $CF_3-NF-C-NF-C-NF_2$ with $NFH, NFH$ and $OCH_3, OCH_3$ |
| 17 | (ring structure with NF₂, FN, F—C, C=NF, NF₂, NF) | (ring structure with NF₂, FN, F—C, C—OCH₃, NF₂, N—F, NFH) |

Further examples of the reaction products obtained from substituted alcohols are shown in Table II. The alcohols are mixed with a five fold excess of dry acetonitrile (distilled from phosphorous pentoxide), perfluoroguanidine is introduced as described in Example 1 and the glass tube is sealed. After 24 hours at room temperature the saturated adducts have formed and are isolated by removal of volatile components at 25° C. at reduced pressure.

polymers shown in Table III by means of the structural units are reacted with excess perfluoroguanidine to give solid polymer adducts comprising the oxidizing groups shown under the heading "Products." In those cases where significant vicinal elimination of $HNF_2$ occurs, the structure of the resultant fluoroimino units is also shown. A basic catalyst of the type hereinelsewhere described, e.g. the sodium salt, is employed with polyacrylic acid and polyacrylamide.

TABLE II

| Ex. | Alcohol | Products | $F^{19}$-Nuclear magnetic resonance absorptions (in $\phi$ units) | |
|-----|---------|----------|---------|---------|
|     |         |          | $-NF_2$ | $-NFH$  |
| 18  | $ClCH_2CH_2OH$ | $ClCH_2CH_2OC(NF_2)_2NFH$ | −21.2 | +138.9 |
| 19  | $CH_3CO_2CH_2CH_2OH$ | $CH_3CO_2CH_2CH_2OC(NF_2)_2NFH$ | −21.1 | +140.7 |
| 20  | $CF_3CO_2CH_2CH_2OH$ | $CF_3CO_2CH_2CH_2OC(NF_2)_2NFH$ | −21.3 | +138.1 |
| 21  | $CH_2=CHCH_2OH$ | $CH_2=CHCH_2OC(NF_2)_2NFH$ | −21.0 | +141.7 |
| 22  | $CH_2\!-\!CH_2$<br>$\;\;\|\quad\;\;\|$<br>$CH_2\;\;CH\!-\!CH_2OH$<br>$\;\;\backslash\;/$<br>$\;\;O$ | $CH_2\!-\!CH_2$<br>$\;\;\|\quad\;\;\|$<br>$CH_2\;\;CH\!-\!CH_2OC(NF_2)_2NFH$<br>$\;\;\backslash\;/$<br>$\;\;O$ | −20.6 | +141.1 |
| 23  | $HOCH_2CH=CHCH_2OH$ | $HFN(NF_2)_2COCH_2CH=CHCH_2OC(NF_2)_2NFH$ | −21.5 | +142.5 |
| 24  | $HOCH_2CH_2CH_2OH$ | $HFN(NF_2)_2COCH_2CH_2CH_2OC(NF_2)_2NFH$ | −21.0 | +142.0 |
| 25  | $CH_2=C(CH_3)CO_2CH_2CH_2OH$ | $CH_2=C(CH_3)CO_2CH_2CH_2OC(NF_2)_2NFH$ | −21.3 | +141.7 |
| 26  | $HC\equiv CCH_2OH$ | $HC\equiv CCH_2OC(NF_2)_2NFH$ | −21.3 | +142.0 |

EXAMPLE 27

Trifluoroethanol (0.096 g., $0.96\times10^{-3}$ mole) and urea (0.039 g., $0.65\times10^{-3}$ mole) are placed in a small glass ampoule. The mixture is degassed at −196° C. and perfluoroguanidine (0.083 g., $0.56\times10^{-3}$ mole) is added. The tube is sealed and the reaction mixture allowed to warm to room temperature and stand for four hours. Urea serves as a basic catalyst for the reaction of trifluoroethanol with perfluoroguanidine to form

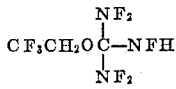

which has fluorine nuclear magnetic responance absorptions at $-21.7\phi$ ($-NF_2$), $+138.5\phi$ doublet ($-NFH$), and $75.5\phi$ ($CF_3$).

EXAMPLE 28

The reaction of polymers with fluoroimino compounds, e.g. perfluoroguanidine, preferably is carried out with the polymer either in solution or at least swollen by a solvent which in itself is not reactive toward the fluorimine. Examples of such non-reactive solvent include acetone, sulfolane, acetonitrile, trifluoroethanol and acetic acid. It will be recognized that the latter two solvents are reactive with fluoroimines in the presence of basic substances and they are therefore not used for amine containing polymers or when a basic catalyst is employed. The reaction of cellulose dinitrate is exemplary of the method employed.

In a dry glass ampoule is placed a solution of dinitrocellulose (11.1% N) (vacuum dried; 0.062 g., $2.5\times10^{-4}$ moles) in 0.29 g. of anhydrous acetone. Perfluoroguanidine (0.095 g., $6.3\times10^{-4}$ moles) is added by condensation at −196° C. and the ampoule is sealed. The mixture is mixed and allowed to stand at 25° C. for 14 days. Fluorine nuclear magnetic resonance absorption at $-21\phi$ shows the presence of $-NF_2$ groups in an alcohol-perfluoroguanidine adduct. The polymer adduct (recovered by opening the ampoule at −196° C. and pouring the contents into anhydrous diethyl ether) is a white solid. Reprecipitation from acetone solution in ether followed by drying in vacuo provides an analytical sample.

Found (percent): F, 8.4; C, 25.3.

The oxidizing capacity is 1.8 milliequivalents of iodine per gram. The material is thus useful as a mild oxidant.

By similar procedures cellulose mononitrate and the

TABLE III

| Example | Polymer | Products |
|---------|---------|----------|
| 29 | $-\!(CH_2CH)\!-$<br>$\quad\;\;\|$<br>$\quad\;OH$ | $-CH_2-CH-$<br>$\quad\quad\;\;\|$<br>$\quad\quad\;O$<br>$\quad\quad\;\|$<br>$\quad\quad\;C(NF_2)_2$<br>$\quad\quad\;\|$<br>$\quad\quad\;NFH$<br>and<br>$-CH_2-CH-$<br>$\quad\quad\;\;\|$<br>$\quad\quad\;O$<br>$\quad\quad\;\|$<br>$\quad\quad\;C=NF$<br>$\quad\quad\;\|$<br>$\quad\quad\;NF_2$ |
| 30 | $-\!(CH)\!-$<br>$\;\;\|$<br>$\;OH)_n$ | $-CH$<br>$\;\;\|$<br>$\;O$<br>$\;\;\|$<br>$\;C(NF_2)_2$<br>$\;\;\|$<br>$\;NFH$<br>and<br>$-CH-$<br>$\;\;\|$<br>$\;O$<br>$\;\;\|$<br>$\;C=NF$<br>$\;\;\|$<br>$\;NF_2$ |
| 31 | $-\!(CH_2CH_2-N\!-\!)$<br>$\quad\quad\quad\;\;\|$<br>$\quad\quad\quad H)_n$ | $-CH_2-CH_2-N-$<br>$\quad\quad\quad\quad\;\|$<br>$\quad\quad\quad\;C(NF_2)_2$<br>$\quad\quad\quad\;\;\|$<br>$\quad\quad\quad\;NFH$<br>and<br>$-CH_2-CH_2-N-$<br>$\quad\quad\quad\quad\;\|$<br>$\quad\quad\quad\;C=NF$<br>$\quad\quad\quad\;\;\|$<br>$\quad\quad\quad\;NF_2$ |
| 32 | $-\!(CH_2-CH_2-N\!-\!)$<br>$\quad\quad\quad\quad\;\|$<br>$\quad\quad\quad\;NH_2)_n$ | $-CH_2-CH_2-N-$<br>$\quad\quad\quad\quad\;\|$<br>$\quad\quad\quad\;NH$<br>$\quad\quad\quad\;\;\|$<br>$\quad\quad\quad\;C(NF_2)_2$<br>$\quad\quad\quad\;\;\|$<br>$\quad\quad\quad\;NFH$<br>and<br>$-CH_2-CH_2-N-$<br>$\quad\quad\quad\quad\;\|$<br>$\quad\quad\quad\;NH$<br>$\quad\quad\quad\;\;\|$<br>$\quad\quad\quad\;C=NF$<br>$\quad\quad\quad\;\;\|$<br>$\quad\quad\quad\;NF_2$ |

| Example | Polymer | Products |
|---|---|---|
| 33 | $-(CH_2-CH-)_n$<br>$\qquad \| $<br>$\quad CONH_2$ | $-CH_2-CH-\quad NF_2$<br>$\qquad \| \qquad \|$<br>$\quad CONHC-NFH$<br>$\qquad \quad \|$<br>$\qquad \quad NF_2$<br>and<br>$-CH_2-CH-$<br>$\qquad \|$<br>$\quad CONHC=NF$<br>$\qquad \quad \|$<br>$\qquad \quad NF_2$ |
| 34 | $-(CH_2-CH-)_n$<br>$\qquad \| $<br>$\quad CO_2H$ | $-CH_2-CH-$<br>$\qquad \| \quad NF_2$<br>$\quad C-OC-NFH$<br>$\; \|\| \quad \|$<br>$\; O \quad NF_2$<br>and<br>$-CH_2-CH$<br>$\qquad \|$<br>$\quad C-OC=NF$<br>$\; \|\| \quad \|$<br>$\; O \quad NF_2$ |
| 35 | $\left(-CH_2-\underset{\underset{H}{\|}}{\overset{\overset{CH_3}{\|}}{C}H}-N-\right)_n$ | $-CH_2-\underset{}{\overset{CH_3}{\|}}CH-N-$<br>$\qquad\qquad \|$<br>$\qquad\qquad C(NF_2)_2$<br>$\qquad\qquad \|$<br>$\qquad\qquad NFH$<br>and<br>$-CH_2-\overset{CH_3}{\underset{\|}{C}H}-N-$<br>$\qquad\qquad \|$<br>$\qquad\qquad C=NF$<br>$\qquad\qquad \|$<br>$\qquad\qquad NF_2$ |

EXAMPLE 36

This example illustrates the formation of adducts from acids.

A solution of 0.008 g. ($0.10\times10^{-3}$ moles) of sodium acetate, 0.088 g. ($1.47\times10^{-3}$ moles) of glacial acetic acid and 0.12 g. ($0.79\times10^{-3}$ moles) of perfluoroguanidine is prepared at $-196°$ C. in a reaction tube as above and the tube sealed and permitted to warm to about 20° C. The solution gradually becomes clear. Very little reaction occurs at ambient temperatures and the mixture is heated at 70° C. for 16 hours. The direct product is $$CH_3\underset{\underset{O}{\|}}{C}OC(NF_2)_2NFH$$

F.—N.M.R., $-25.6\phi$ ($NF_2$) and $+130.8\phi$ (NFH)

In the presence of the base, there is vicinal elimination of difluoroamine ($HNF_2$) to give:

$$CH_3\underset{\underset{O}{\|}}{C}O-\underset{\underset{NF_2}{\|}}{C}=NF$$

F.—N.M.R., $-49.3\phi$ ($-NF_2$) and $-0.5\phi$ ($=NF$)

Similarly, when glacial acrylic acid is employed $$(NFH)(NF_2)_2C-O-\overset{\overset{O}{\|}}{C}-CH=CH_2$$

is obtained (absorption at ca. $+136\phi$). It is found to be partially polymerized so that the adduct is comparable to that obtained from polyacrylic acid above and is likewise an oxidant.

Other acids and acid derivatives (addends) are likewise reacted with perfluoroguanidine by the hereinabove described procedures using appropriate solvents and where necessary (Examples 37, 38, 41 and 42) basic catalysts to provide the fluoroamino compounds shown in Table IV together with the indicated fluoroimino compounds formed by vicinal elimination of $HNF_2$.

TABLE IV

| Example | Addend | Products |
|---|---|---|
| 37 | 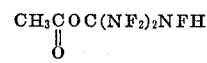—$CH_2CO_2H$ | ⌬—$CH_2C-O\underset{\underset{NF_2}{\|}}{\overset{\overset{NF_2}{\|}}{C}}-NFH$<br>$\qquad\qquad \|\|$<br>$\qquad\qquad O$<br>and<br>⌬—$CH_2C-O\underset{\underset{NF_2}{\|}}{C}=NF$<br>$\qquad\qquad \|\|$<br>$\qquad\qquad O$ |
| 38 | $CH_2=CHCONH_2$ | $CH_2=CHC-NH\underset{\underset{NF_2}{\|}}{\overset{\overset{NF_2}{\|}}{C}}-NFH$<br>$\qquad\quad \|\|$<br>$\qquad\quad O$<br>and<br>$CH_2=CHC-NH\underset{\underset{NF_2}{\|}}{C}=NF$<br>$\qquad\quad \|\|$<br>$\qquad\quad O$ |
| 39 | 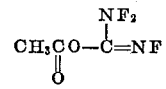—$CH_2\underset{\underset{O}{\|\|}}{C}NHNH_2$ | ⌬—$CH_2CNHN\underset{\underset{NF_2}{\|}}{\overset{\overset{NF_2}{\|}}{HC}}-NFH$<br>$\qquad\qquad \|\|$<br>$\qquad\qquad O$<br>and<br>⌬—$CH_2CNHN\underset{\underset{NF_2}{\|}}{HC}=NF$<br>$\qquad\qquad \|\|$<br>$\qquad\qquad O$ |
| 40 | $H_2N\underset{\underset{O}{\|\|}}{C}NHNH_2$ | $H_2NCNHN\underset{\underset{NF_2}{\|}}{\overset{\overset{NF_2}{\|}}{HC}}-NFH$<br>$\quad\; \|\|$<br>$\quad\; O$<br>and<br>$H_2NCNHN\underset{\underset{NF_2}{\|}}{HC}=NF$<br>$\quad\; \|\|$<br>$\quad\; O$ |

TABLE IV—Continued

| Example | Addend | Products |
|---|---|---|
| 41 | cyclic: CH₂-C(=O)-NH-C(=O)-CH₂-CH₂-CH₂ (glutarimide) | cyclic: CH₂-C(=O)-N(-C(NF₂)(NF₂)-NFH)-C(=O)-CH₂-CH₂-CH₂ and cyclic: CH₂-C(=O)-N(-C(NF₂)=NF)-C(=O)-CH₂-CH₂-CH₂ |
| 42 | $HCNHOH$ with $\|O\|$ (i.e., HC(=O)NHOH) | $HCONHOC(NF_2)-NFH \cdot NF_2$ and $HCONHOC(NF_2)=NF$ |
| 43 | $H_2NCNH_2$, $\|NH\|$ (guanidine) | $H_2NC(=NH)NHC(NF_2)-NFH$ with $NF_2$ and $H_2NC(=NH)-NHC(NF_2)=NF$ |
| 44 | $n\text{-}C_{11}H_{23}C(=NH)NH_2$ | $n\text{-}C_{11}H_{23}C(=NH)-NHC(NF_2)-NFH$ with $NF_2$ and $n\text{-}C_{11}H_{23}C(=NH)-NH-C(NF_2)=NF$ |
| 45 | $HC(=NH)NHCH_3$ | $HC(=NH)-N(CH_3)-C(NF_2)-NFH$ with $NF_2$ and $HC(=NH)-N(CH_3)-C(NF_2)=NF$ |
| 46 | $HC(NH_2)=NOH$ | $HC(NH_2)=N-OC(NF_2)-NFH$ with $NF_2$ and $HC(NH_2)=N-OC(NF_2)=NF$ |
| 47 | $H_2NC(=NH)NHNH_2$ | $H_2NC(=NH)-NHNH-C(NF_2)-NFH$ with $NF_2$ and $H_2NC(=NH)-NHNH-C(NF_2)=NF$ |
| 48 | $C_{17}H_{35}C(=NH)NHNH_2$ | $C_{17}H_{35}C(=NH)NHNH-C(NF_2)-NFH$ with $NF_2$ and $C_{17}H_{35}C(=NH)-NHNHC(NF_2)=NF$ |

TABLE IV—Continued

| Example | Added | Products |
|---|---|---|
| 49 | $C_2H_5\underset{\underset{NNH_2}{\|}}{C}-NHNH_2$ | $C_2H_5\underset{\underset{NNH_2}{\|}}{C}-NHNH-\underset{\underset{NF_2}{\|}}{C}-NFH$<br>and<br>$C_2H_5\underset{\underset{NNH_2}{\|}}{C}-NHNH-\underset{\underset{NF_2}{\|}}{C}=NF$ |
| 50 | $C_{13}H_{27}\underset{\underset{NOH}{\|}}{C}-NHNH_2$ | $C_{13}H_{27}\underset{\underset{NOH}{\|}}{C}-NHNH\underset{\underset{NF_2}{\|}}{C}-NFH$<br>and<br>$C_{13}H_{27}\underset{\underset{NOH}{\|}}{C}-NHNH\underset{\underset{NF_2}{\|}}{C}=NF$<br>and<br>$C_{13}H_{27}\underset{\underset{NOC(NF_2)_2NFH}{\|}}{C}-NHNH\underset{\underset{NF_2}{\|}}{C}=NF$ |

EXAMPLE 51

Anhydrous ammonia (0.60 mole) is condensed into a reaction tube containing dry tetrahydrofuran (0.12 g.) and fluorotrichlormethane (0.06 g.). The tube is warmed to $-80°$ and shaken to mix the liquids. Perfluoroguanidine (0.71 mole) is added and the tube sealed. As the tube warms liquid perfluoroguanidine runs down the tube and a yellow solid forms and the solution becomes pale yellow. The reaction mixture stands at 25° C. for several days.

The product of the reaction, obtained by evaporation of more volatile materials and solvent, is:

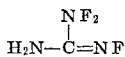

F—N.M.R.: $-47.3\phi$ (—NF$_2$) and $52.1\phi$ (=NF)

formed by vicinal elimination of HNF$_2$ from H$_2$N—C(NF$_2$)$_2$NFH present at low temperatures.

Other quasi-organic compounds can be added to the perfluorinated oxidant, thus, hydrogen peroxide, carbonic acid, carbamic acid, cyanic acid, etc. form adducts.

EXAMPLE 52

A solution of 0.027 g. (0.32×10$^{-3}$ mole) of 2-pyrrolidone and 0.058 g. of acetonitrile is reacted with perfluoroguanidine employing the procedure of Example 1. The solution changes from colorless to dark amber after about 15 minutes at room temperature. F—N.M.R. absorption spectroscopy shows the presence of

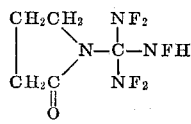

(—NF$_2$, $-23\phi$; —NFH, $+132\phi$ doublet) and the product of vicinal elimination of HNF$_2$:

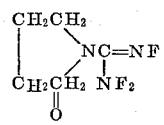

(—NF$_2$, $-46\phi$; =NF, $-5\phi$)

EXAMPLE 53

Urea (0.023 g., 0.38×10$^{-3}$ mole) in 0.134 g. of redistilled sulfolane is reacted with perfluoroguanidine (0.055 g., 0.37×10$^{-3}$ mole) by the procedure of Example 1 above to give

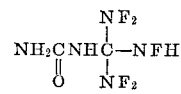

F—N.M.R.: —NF$_2$, $-18\phi$; $+137\phi$ and the product of vicinal elimination of HNF$_2$:

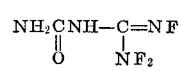

F—N.M.R.: —NF$_2$, $-31\phi$; =NF, $+53\phi$.

When the following amines are reacted with perfluoroguanidine in suitable solvent at temperatures below 0° C. by the above procedures the products shown in Table V are obtained together with the indicated fluorimino compounds.

TABLE V

| Ex. | Amine | Products |
|---|---|---|
| 54 | CH$_3$NH$_2$ | $CH_3NH\underset{\underset{NF_2}{\|}}{C}-NFH$<br>and<br>$CH_3NH\underset{\underset{NF_2}{\|}}{C}=NF$ |
| 55 | (C$_2$H$_5$)$_2$NH | $(C_2H_5)_2N\underset{\underset{NF_2}{\|}}{C}-NFH$<br>and<br>$(C_2H_5)_2N\underset{\underset{NF_2}{\|}}{C}=NF$ |
| 56 | $\begin{array}{c}CH_2-CH_2\\CH_2\quad\quad CHNH\\CH_2-CH_2\quad CH_3\end{array}$ | $\begin{array}{c}CH_2-CH_2\quad\quad NF_2\\CH_2\quad\quad CH-N-C-NFH\\CH_2-CH_2\quad CH_3\quad NF_2\end{array}$<br>and<br>$\begin{array}{c}CH_2-CH_2\\CH_2\quad\quad CH-N-C=NF\\CH_2-CH_2\quad CH_3\quad CH_3\end{array}$ |

TABLE V.—Continued

| Ex. | Amine | Products |
|---|---|---|
| 57 | C₆H₅—CH₂NH—C₂H₅ | C₆H₅—CH₂—N(C₂H₅)—C(NF₂)(NF₂)—NFH and C₆H₅—CH₂—N(C₂H₅)—C(NF₂)=NF |
| 58 | (CH₂-CH₂)(CH₂-CH₂)NH (pyrrolidine) | (CH₂-CH₂)(CH₂-CH₂)N—C(NF₂)—NFH and (CH₂-CH₂)(CH₂-CH₂)N—C(NF₂)=NF |
| 59 | (CH₂-CH₂)(CH₂-CH₂)CH—NH | (CH₂-CH₂)(CH₂-CH₂)CH=N—C(NF₂)—NFH and (CH₂-CH₂)(CH₂-CH₂)CH=N—C(NF₂)=NF |

EXAMPLE 60

Pure acetoxime (0.154 g., 0.0021 mole) is reacted with perfluoroguanidine (0.0028 mole) by the procedure of Example 1 by letting the mixture warm in air (from $-196°$ C.) for 1 minute then immersing in a $-79°$ bath for 0.5 hr. The vessel is then removed from the bath and permitted to warm to room temperature (0.5 hr.). The excess perfluoroguanidine (about .0007 mole) is volatilized at 25° by successive expansion into a vacuum system. The final vapor pressure of the nearly pure liquid adduct is about 3 mm. of Hg.

It is:

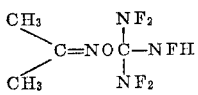

F—n.m.r.: $-NF_2$, $-20.5\phi$ doublet; $-NFH$, $+133.1\phi$ doublet, fivefold

H—n.m.r. NH, $+0.90\tau$ doublet; $CH_3$, $7.94\tau$; $CH_3$ $8.02\tau$

On warming a sample of the adduct to about 60° C. under vacuum, yellowing occurs. The adduct is stable at room temperature.

The above liquid perfluoroguanidine-acetoxime adduct about 0.44 g.; 0.002 mole) is transferred to a small copper vessel and the fluorination carried out in a manner similar to that described in Example 2 above. After purging with $N_2$ for 0.5 hr. while lowering the temperature of the reactor to $-21°$, a 2.7% $F_2$ (97.3% $N_2$) stream is allowed to pass over the liquid adduct for 2 hrs. (Total $F_2$, 0.06 mole.) The product gases are conducted through a NaF scrubber (at 25°) to remove any HF and the condensable materials are then collected at $-183°$ C. The small amount of liquid remaining in the dish after fluorination is swept into the trap by purging with $N_2$ and warming the reaction chamber to room temperature. The product trap is degassed ($-196°$) and then allowed to warm to room temperature while exhausting through U tubes (in series) cooled at $-35°$, $-119°$, and $-196°$, respectively.

The stabilized fluorinated oxidants are found in the $-35°$ trap:

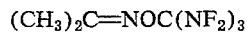

F—N.M.R.: $-24.3\phi$ (NF₂)
M—N.M.R.: 7.92, 7.98τ (CH₃)

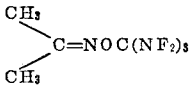

F—N.M.R.: $-26.2\phi$ (NF₂); 7.81τ (CH₃); 5.10τ (doublet; CH₂F).

When other hydroxylamines are reacted with perfluoroguanidine using essentially the procedure of Example 1, similar results are obtained as shown in Table VI.

Nitramines also react by this procedure employing acetonitrile as solvent and triethylamine as a catalyst. Products obtained when exemplary compounds are employed are also shown in Table VI.

TABLE VI

| Ex. | Addend | Products |
|---|---|---|
| 61 | CH₃ONH₂ | CH₃ONHC(NF₂)—NFH and CH₃ONHC(NF₂)=NF |
| 62 | C₈H₁₇NHOH | C₈H₁₇NHOC(NF₂)—NFH and C₈H₁₇NHOC(NF₂)=NF |
| 63 | C₂H₅OC(O)CH₂CH₂NHOH | C₂H₅OC(O)CH₂CH₂NHOC(NF₂)—NFH and C₂H₅OC(O)CH₂CH₂NHOC(NF₂)=NF |
| 64 | CH₂(NF₂)—CH(NF₂)—CH₂NHOH | CH₂(NF₂)—CH(NF₂)—CH₂NHOC(NF₂)—NFH and CH₂(NF₂)—CH(NF₂)—CH₂NHOC(NF₂)=NF |
| 65 | C₄H₉NHNO₂ | C₄H₉N(NO₂)—C(NF₂)—NFH and C₄H₉N(NO₂)—C(NF₂)=NF |
| 66 | O₂NNHCH₂NHNO₂ | O₂NN[C(NF₂)—NFH]—CH₂—N(NO₂)—C(NF₂)—NFH and O₂NN[C(NF₂)=NF]—CH₂—O₂NN—C(NF₂)=NF |

EXAMPLE 67

Into a dry glass reactor equipped with a magnetic stirrer and a pressure valve is placed 0.181 g. (1.54×10⁻³ mole) of diaminoglyoxime and 2.20 g. of anhydrous pure dioxane. The mixture is cooled to −119° C., evacuated and 0.95 g. (6.4×10⁻³ mole) of perfluoroguanidine are condensed therein. The valve is closed and the mixture is stirred at 25° C. for one hour. The solvent is then evaporated at 25° C. under reduced pressure and finally under less than 0.1 mm. of Hg pressure for 15 minutes. The residual white solid which is stable at room temperature is recrystallized from dry benzene.
It is:

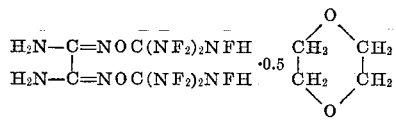

The white solid adduct, which is a potent solid rocket fuel oxidizer, has:

M.P.: 90° C. with decomposition;
Shock sensitivity: less than 1.8 cm. with 2 kg. weight.
Calculated for $C_6H_{10}N_{10}O_3F_{10}$ (percent): C, 18.8; F, 38.0. Found (percent): C, 19.6; F, 37.4, 38.6.
Nuclear magnetic resonance absorption: −21.2$\phi$ (—NF$_2$); +138.3$\phi$ (—NFH); −1.13$\tau$ (—NFH); 3.38$\tau$ (—NH$_2$); 6.33$\tau$ (—CH$_2$— of dioxane).

The diaminoglyoxime-perfluoroguanidine diadduct is obtained free from complexing solvent when acetonitrile which has been distilled from phosphorous pentoxide is used as the solvent in the foregoing procedure. The unsolvated diadduct is a white solid which is recrystallized from carbon tetrachloride:

M.P.: 69–71° C.;
Shock sensitivity: less than 1.8 cm. with 2 kg. weight.
Calculated for $C_4H_6F_{10}O_2$ (percent): C, 11.5; N, 33.6; F, 45.7. Found (percent): C, 11.2; N, 35.1; F, 43.2.

The solid decomposes slowly at 25° C. but is stable indefinitely at −80° C.

The solid diadduct is made more energetic and is simultaneously stabilized to storage and shock sensitivity by fluorination of the —NFH groups to —NF$_2$ groups by the procedure hereinelsewhere described.

In a dry 100 ml. flask are placed 8.0 ml. of 1,1,2-trifluoro-1,2,2-trichloroethane and 0.115 g. (2.76×10⁻⁴ mole) of unsolvated diaminoglyoxime-perfluoroguanidine diadduct. The solid dissolves at 50° C. but crystallizes when the solution is cooled rapidly as a very fine precipitate. The flask is attached to a Monel gas transfer apparatus and the noncondensable gases are removed from the flask at −78° C. by repeated evacuations. The contents of the flask are maintained at −31° C. (by external cooling with a bromobenzene slush bath) and stirred while 1.5×10⁻³ mole of undiluted elemental fluorine is introduced incrementally over a 4 hour period at such a rate that the total pressure measured by a transducer never exceeds 200 mm. The gases and solvent are removed from the reaction flask at reduced pressure to a pressure of about 0.5 mm. of Hg. The residue is a high boiling shock sensitive high fluorine containing oil containing the —OC(NF$_2$)$_3$ group. Fluorine nuclear magnetic resonance absorption is at −25.9$\phi$ corresponding to the —NF$_2$ substituents in the —OC(NF$_2$)$_3$ group.

EXAMPLE 68

In a dry glass ampoule are placed 12 mgm. of biguanide (1.2×10⁻⁴ mole) and 0.128 g. of tetramethylenesulfone (sulfolane). The solid is dissolved by warming and the solution is quickly cooled to −119° C. and perfluoroguanidine added by condensation in vacuo. The ampoule is sealed and allowed to warm to about 15° C. slowly. The tube is shaken and cooled intermittently until the perfluoroguanidine phase dissolves and the solution is then stored at −78° C. The diadduct formed exists in tautomeric forms shown by the formulae:

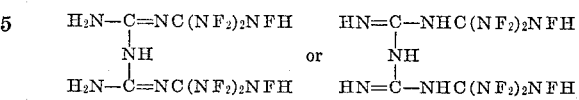

Fluorine nuclear magnetic resonance absorption at −22$\phi$ shows the presence of the —NF$_2$ groups.

EXAMPLE 69

A solution of 18 mgm. of formyl hydrazide (3.0×10⁻⁴ mole) in 60 mgm. of dry acetonitrile is prepared in a dry glass vessel and perfluoroguanidine (4.7×10⁻⁴ mole) is condensed therein. The vessel is sealed and warmed slowly from −119° C. to room temperature with shaking. The yellow homogeneous solution is allowed to stand at 25° C. for ¼ hour and is then stored at −80° C. Fluorine nuclear magnetic resonance absorptions at −22$\phi$ (—NF$_2$) and 136–142$\phi$ (four quintuplets due to —NFH groups) show the formation of adduct:

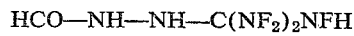

When the adducts of perfluoroguanidine formed in the above examples are subjected to basic conditions, e.g. excess triethylamine, sodium fluoride, etc., vicinal elimination of HNF$_2$ is brought about with the formation of fluoroimino compounds. When similar adducts are formed from perfluoroformamidine his same treatment results in vicinal elimination of HF and formation of the same fluoroimino compounds which have the structure of the original addend with the active hydrogen atom replaced by a perfluoroamidine function, thus, for example,

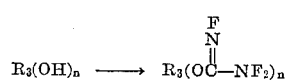

When the mono-, di-, tri- and poly-adducts containing —NFH groups obtained as described in Examples 1 to 69 above are fluorinated under mild conditions by the procedures described hereinabove, the —NFH groups are converted to —NF$_2$ groups and the stability of the compounds is thereby enhanced.

What is claimed is:

1. Adducts of perfluorinated oxidant compounds having at least one fluorimino group, containing only carbon, nitrogen and fluorine, and having up to 11 carbon atoms, with essentially anhydrous compounds free from sulfur and phosphorus having from 1 to 18 carbon atoms when monomeric and containing at least one active hydrogen atom attached to the said anhydrous compound through an atom having atomic number from 7 to 8, said adducts containing at least one NFH group attached to a carbon atom thereof.

2. Adducts of perfluorinated oxidant compounds having at least one fluorimino group, containing only carbon, nitrogen and fluorine, and having up to 11 carbon atoms, with essentially anhydrous compounds free from sulfur and phosphorus, having from 1 to 18 carbon atoms when monomeric and containing at least one active hydrogen atom attached to the said anhydrous compound through an atom having atomic number from 7 to 8, said adducts containing at least one fluorimino group.

3. Adducts of perfluorinated oxidant compounds having at least one fluorimino group, containing only carbon, nitrogen and fluorine, and having up to 11 carbon atoms, with essentially anhydrous compounds free from sulfur and phosphorus, having from 1 to 18 carbon atoms and containing at least one active hydrogen atom attached to the said anhydrous compound through an atom having atomic number from 7 to 8, said adducts containing at least one —NF$_2$ group attached to carbon and being free from hydrogen atoms attached to nitrogen.

4. Compounds having the formula:

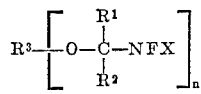

wherein $R^1$ and $R^2$ are each a member of the group consisting of fluorine and difluoramino, difluoramino-substituted perfluoroalkyl, difluoramino-substituted perfluoroalkylfluoramino, perfluoroalkyl, perfluoroalkylfluoramino, fluoramino-substituted perfluoroalkyl and fluorimino-substituted perfluoroalkylfluoramino radicals, said perfluoroalkyl moieties having from 1 to 5 carbon atoms, and when taken together with the carbon atom to which they are attached, $R^1$ and $R^2$ form a ring system having 6 atoms; $n$ is an integral number from 1 to 6, X is a member of the group consisting of hydrogen, fluorine and chlorine and $R^3$ is a member of the group consisting of
  (a) unsubstituted alkyl groups having from 1 to 18 carbon atoms and $n$-valencies,
  (b) substituted alkyl groups having from 1 to 18 carbon atoms and $n$-valencies and substituted by not more than 3 of the group consisting of double bonds, triple bonds, nitro, carboxyl, carboalkoxy, alkoxycarbonyl, nitrato, nitrido, chloro, fluoro, difluoroamino, oxo and aldehydo groups,
  (c) phenyl (lower alkyl),
  (d) cycloalkyl groups having 4 to 6 carbon atoms in the ring and not more than 12 carbon atoms, and
  (e) oxacycloalkyl groups having 2 to 5 carbon atoms in the ring and up to 7 carbon atoms.

5. The adduct of methanol and perfluoroguanidine.

6. The adduct of methanol and perfluoro-N-methyl guanidine.

7. The adduct of glycerine and perfluoroguanidine having the structure $$HFN-C(NF_2)_2-O-CH(CH_2OC(NF_2)_2NFH)_2$$

8. The adduct of ethylene glycol and perfluoroguanidine having the structure $(CH_2OC(NF_2)_2NFH)_2$.

9. The adduct of methanol and perfluoroformamidine.

10. The adduct of perfluorocyclohexylimine and methanol.

11. The adduct of 1-hydroxyl - 2,3 - bis(difluoramino) propane and perfluoroguanidine.

12. The adduct of diaminoglyoxime and perfluoroguanidine having the structure

13. The fluorinated adduct of methanol and perfluoroguanidine having the structure $CH_3O-C(NF_2)_3$.

14. The fluorinated adduct of ethylene glycol and perfluoroguanidine having the structure

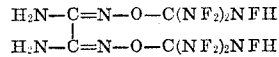

15. The process for producing monofluoroamino adducts of perfluorinated oxidant compounds having at least one fluorimino group and containing only carbon, nitrogen and fluorine, and essentially anhydrous active-hydrogen-containing compounds containing at least one active hydrogen atom connected through an atom having atomic number from 7 to 8, which comprises the step of maintaining contact between said oxidant compounds and said active hydrogen containing compounds under conditions at least as nucleophilic as those provided by 2-chloroethanol.

16. The process for substantially enhancing the stability of monofluoramino-group containing adducts of fluorinated oxidants and active hydrogen-containing compounds, which comprises the step of subjecting an adduct of a perfluorinated oxidant compound having at least one fluorimino group, containing only carbon, nitrogen and fluorine, and having up to 11 carbon atoms, with essentially anhydrous compounds free from sulfur and phosphorus having from 1 to 18 carbon atoms when monomeric and containing at least 1 active hydrogen atom attached to the said compound through an atom having atomic number from 7 to 8, said adducts containing at least one —NFH group attached to a carbon atom, to the action of fluorine at a partial pressure of not more than about 0.25 atmosphere at a temperature between about $-100°$ and $+25°$ C.

17. The process for the formation of fluorimino group containing oxidants which comprises the step of subjecting monofluoroamino-group-containing adducts of perfluorinated oxidants with active hydrogen containing compounds, said adducts having a member of the group consisting of fluorine and difluoramino on the same atom as the monofluoramino group, to the action of a mild basic reagent whereby vicinal elimination of a member of the group consisting of HF and $HNF_2$ is effected.

References Cited

UNITED STATES PATENTS 3,103,456  9/1963  Lawton et al. _____ 60—35.4 X
3,149,165  9/1964  Sausen _____ 149—36 X LELAND A. SEBASTIAN, Primary Examiner U.S. Cl. X.R.

149—109; 260—2 R, 78.5 T, 89.7 S, 91.3 R, 91.3 VA, 96 HA, 223, 249.8, 293.87, 326.5 L, 340.6, 347.7, 476 R, 482 C, 486 R, 487, 488 R, 553 R, 564 R, 564 A, 566 R, 566 A, 566 AE, 573, 577, 583 NH, 584 R, 584 A, 584 C, 694

UNITED STATES PATENT OFFICE
CERTIFICATE OF CORRECTION

Patent No. 3,707,555    Dated December 26, 1972

Inventor(s) Charles D. Wright and Joseph LaMar Zollinger

It is certified that error appears in the above-identified patent and that said Letters Patent are hereby corrected as shown below:

Column 7, line 18, for "quintruplet" read --quintuplet--.

Column 21, line 19, for ">N-C-NF" read  -->N-C=NF-- .
$$\phantom{Column 21, line 19, for \text{">}}\underset{NF_2}{|}\phantom{read -->}\underset{NF_2}{|}$$

Column 22, line 6, for "M -N.M.R." read --H - N.M.R.--.

Column 22, line 10, for "$CH_3$" read --$CH_2F$--.

Column 24, line 55, for "NFH" read -- -NFH-- .

Signed and sealed this 25th day of December 1973.

(SEAL)
Attest:

EDWARD M. FLETCHER, JR.
Attesting Officer

RENE D. TEGTMEYER
Acting Commissioner of Patents